(12) United States Patent
Tan et al.

(10) Patent No.: US 9,890,661 B2
(45) Date of Patent: *Feb. 13, 2018

(54) AERO ENGINE ROTOR AIR FLOATATION ASSEMBLING DEVICE BASED ON GANTRY STRUCTURE

(71) Applicant: HARBIN INSTITUTE OF TECHNOLOGY, Harbin, Heilongjiang (CN)

(72) Inventors: Jiubin Tan, Heilongjiang (CN); Chuanzhi Sun, Heilongjiang (CN); Lei Wang, Heilongjiang (CN); Bo Zhao, Heilongjiang (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/118,322

(22) PCT Filed: Dec. 26, 2014

(86) PCT No.: PCT/CN2014/095057
§ 371 (c)(1),
(2) Date: Aug. 11, 2016

(87) PCT Pub. No.: WO2015/120745
PCT Pub. Date: Aug. 20, 2015

(65) Prior Publication Data
US 2017/0175584 A1    Jun. 22, 2017

(30) Foreign Application Priority Data
Feb. 14, 2014    (CN) .......................... 2014 1 0052282

(51) Int. Cl.
| | | |
|---|---|---|
| F01D 25/28 | (2006.01) | |
| G01B 7/31 | (2006.01) | |
| G01C 9/06 | (2006.01) | |

(52) U.S. Cl.
CPC ............... *F01D 25/28* (2013.01); *G01B 7/31* (2013.01); *F05D 2230/60* (2013.01); *G01C 9/06* (2013.01); *G01C 2009/064* (2013.01)

(58) Field of Classification Search
CPC ......... B23P 15/04; B23P 15/006; B23P 19/10; F01D 5/02; F01D 5/005; F01D 25/285;
(Continued)

(56) References Cited

U.S. PATENT DOCUMENTS 5,329,230 A * 7/1994 Viertl ................... G01N 27/902
324/226
5,670,879 A * 9/1997 Zombo .............. G01N 27/9013
324/227
(Continued)

FOREIGN PATENT DOCUMENTS

| CN | 1635589 | 7/2005 |
| CN | 101799354 | 8/2010 |

(Continued)

OTHER PUBLICATIONS

International Preliminary Report on Patentability dated Aug. 16, 2016 in International Application No. PCT/CN2014/095057 (5 pages), with Written Opinion of the International Searching Authority (7 pages), with English translations.
(Continued)

*Primary Examiner* — Ryan J Walters
*Assistant Examiner* — Lawrence Averick
(74) *Attorney, Agent, or Firm* — Nixon & Vanderhye P.C.

(57) ABSTRACT

An aero engine rotor air floatation assembling method and device based on a gantry structure belong to mechanical
(Continued)

assembling technology. The present invention can effectively solve the problem of poor coaxality after the aero engine rotor is assembled and has the characteristics of high coaxality after the rotor is assembled, reduced vibration, mounting easiness, high flexibility and improved engine performance. The measuring method and device are: determining rotary reference based on a rotary air bearing; determining the angular positioning of a rotary table according to a grating ruler; extracting the radial error of the radial mounting plane and the inclination error of the axial mounting plane of the rotor based on the four-probe measuring device to obtain the influencing weight of this rotor to the assembled rotor on coaxality; measuring respectively all the rotors required for assembling to obtain the influencing weight of each rotor to the assembled rotor on coaxality; vector optimizing the weight of each rotor to obtain the assembling angle of each rotor.

1 Claim, 1 Drawing Sheet

(58) Field of Classification Search
CPC ........... F05D 2230/64; F05D 2220/323; F05D 2250/31; G01M 7/02; G01M 15/00; Y10T 29/37; Y10T 29/49771; Y10T 29/49002; Y10T 29/49321; Y10T 29/53039; G01B 5/205; G01B 5/207
USPC ........... 29/407.01, 407.05, 407.09, 705, 712, 29/889.21, 889.2, 243
See application file for complete search history.

(56) References Cited

U.S. PATENT DOCUMENTS

| | | | | |
|---|---|---|---|---|
| 6,414,480 | B1* | 7/2002 | Traxler | B82Y 15/00 324/202 |
| 7,190,162 | B2* | 3/2007 | Tenley | G01N 27/9013 324/238 |
| 7,424,823 | B2* | 9/2008 | Teolis | G01M 15/14 73/112.01 |
| 7,912,587 | B2* | 3/2011 | Walters | F01D 5/027 324/154 R |
| 8,472,033 | B2* | 6/2013 | Takeda | F01K 13/02 33/412 |
| 9,348,001 | B2* | 5/2016 | Reid | G01N 27/90 |
| 2006/0112577 | A1 | 6/2006 | Jones | |
| 2011/0149300 | A1* | 6/2011 | Takeda | F01K 13/02 356/614 |
| 2014/0241852 | A1* | 8/2014 | Fuller | F02C 7/00 415/1 |
| 2015/0046126 | A1* | 2/2015 | Kepler | F01D 5/06 702/189 |
| 2017/0114656 | A1* | 4/2017 | Gallimore | F01D 17/04 |

FOREIGN PATENT DOCUMENTS

| | | |
|---|---|---|
| CN | 102175135 | 9/2011 |
| CN | 202024752 | 11/2011 |
| CN | 103808252 | 5/2014 |
| EP | 2 525 049 | 11/2012 |

OTHER PUBLICATIONS

International Search Report for PCT/CN2014/095057, dated Mar. 24, 2015, 4 pages.

* cited by examiner

AERO ENGINE ROTOR AIR FLOATATION ASSEMBLING DEVICE BASED ON GANTRY STRUCTURE

This application is the U.S. national phase of International Application No. PCT/CN2014/095057 filed 26 Dec. 2014, which designated the U.S. and claims priority to CN Patent Application No. 201410052282.X filed 14 Feb. 2014, the entire contents of each of which are hereby incorporated by reference.

TECHNICAL FIELD

The present invention belongs to mechanical assembling technology, and mainly relates to an aero engine rotor air floatation assembling method and device based on a gantry structure.

BACKGROUND ART

Aero engine assembling is the last sector in the manufacturing process of an aero engine, and is also one of the most important manufacturing sectors. Under existing aero engine design and processing technology conditions, the quality and the working efficiency of the assembling make great contributions to the quality, performance and working efficiency of the engine. Therefore, during the assembling, the coaxality of the rotor after being mounted should be increased as much as possible, thereby reducing the vibration of the aero engine and improving the performance of the aero engine. However, in real production, the assembling of the aero engine is completely hand-assembled, and the accuracy degree and the stability of the assembling depends entirely on the operational experience and technical level of the assembling workers, therefore, there is a lack of a fast and efficient method that guides the assembling of the aero engine rotor, improves the assembling efficiency, reduces the vibration of the aero engine and improves the performance of the aero engine.

With the development of the aero engine assembling test technology, the aero engine assembling test technology gets more and more attention and becomes the research hotspot. More and more researchers hold in-depth discussions about the aero engine rotor, and Rolls-Royce PLC proposed a scheme (System and method for improving the damage tolerance of a rotor assembling. The European Patent Publication Number: EP 2525049 A2), which is mainly that: each sub test system obtains the stress signal of each position of the rotor, the main system analyzes the signals collected by each sub system, and analyzes the influence on the assembling from damage tolerance parameters of each rotor, thereby improving the assembling of the aero-engine rotor. This method has the following problem: the influence of the aspect of the geometric quantity of the rotor on the assembling is not analyzed, therefore, it is impossible to improve the influence of the geometric quantity on the assembling.

Xi'an Jiaotong University proposed a method for detecting the aero engine rotor assembling performance (A method for detecting the aero engine rotor assembling performance. Publication Number: CN101799354A). The method first uses exciter to excite the aero engine rotor, and obtains a multi-carrier coupled impulse response signal of the aero engine rotor by using a vibration sensor and a signal collecting system software; and then, analyzes the obtained multi-carrier coupled impulse response signal of the aero engine rotor by using the dual tree complex wavelet transform method, so as to obtain eight single-carrier impulse response sub-signal of the aero engine rotor; finally, extracts the average assembling performance index from the obtained eight single-carrier impulse response sub-signal of the aero engine rotor, wherein, if the obtained average assembling performance index value is greater than or equal to 10, it is determined that the assembling of the aero engine rotor is qualified, and if the obtained average value is less than 10, it is determined to be unqualified, and then it is necessary to rework and repair. This method has the following problem: there is no guidance for assembling the aero engine rotor.

LUOXIN PRECISION PART (Shanghai) Co., Ltd proposed a device for measuring coaxality (A coaxality measuring device. Publication Number: CN202024752U). This device includes a pair of driving spindles provided on the main body of the device and whose rotation is synchronically controlled by a synchronization mechanism, and the inner ends of the driving spindle are correspondingly provided with a probe and a positioning reference plane respectively; a sensor probe is provided above the position between the probes. It mainly achieves the measurement of the coaxality and jitter of the existing precision parts. This method has the following problem: only the coaxality of the measured part is measured, and the problem of poor coaxality after the rotor is assembled is not solved.

Shenyang Liming Aero-Engine (Group) Co., Ltd. proposed a gap measurement method (A non-contact measurement method for the radial gap of the engine rotor blade tips. Publication Number: CN102175135A). This method uses measurement techniques of capacitance method, and the measuring steps are as follows: at first, assembling the measurement system, calibrating the sensor, and setting the relationship between the radial gap of the blade tips and the voltage, and then, fixing the sensor on the blade, finally, measuring the radial gap of the engine rotor blade tips. This method has the following problem: the influence of the axial mounting plane during the assembling the rotor to the assembled rotor is not considered.

The test object of the aero engine assembling is a turbine stator and a rotor, and under the condition that the part processing precision satisfies the requirement, the final test result is determined by the state after mounting and fitting, whereas the assessment index is mainly the coaxality parameter of the rotor after assembling. The rotation of the engine generates high pressure, and its rotor is constituted by a plurality of single components combined together, wherein, it is the most ideal when the rotary shaft of each component coincides with the axis of the entire engine. The high-speed rotation speed of the high-performance engine is larger than 10000 rpm when it is working, and the axial or radial deflection of the single component will inevitably result in that the center of the turbine disk offsets from the rotation axis of the engine, therefore, a very large centrifugal force will be generated under such condition, which will lead to unbalance of the rotor rotation and lead to engine vibration, thereby ensuring that the coaxality after each component is assembled is the important and difficult issue to be solved during mounting.

As for a model assembling without using coaxality optimization method, due to processing precision limitations, there are errors in the axial direction and radial direction of each component, such as jitter, eccentricity, inclination and so on. If it is assembled directly and randomly, so it may have the case that a bending similar to the "banana" is formed, that is, the eccentricity and inclination errors of each lower component are accumulated to the upper component, resulting in entire deflection and great inclination after the assembling, and leading to poor coaxality of the engine rotor, and therefore, it is difficult to satisfy application requirements At present, the domestic engine assembling still adopts traditional assembling method which is dominated by manually testing with a dial gauge. The engine is assembled in accordance with the order from the bottom to the top, and measurement is done right after one component is assembled so as to ensure that the entirety after adding a component each time can satisfy the threshold conditions of the coaxality, and then another component is mounted upwardly. Each time, the previous component is taken as a reference, and finally, the coaxality of the entirety is required to be within a certain range. This method is time consuming, and the possibility to rework is large, which affects the mounting efficiency and the one-time success rate, and usually, the one-time successful assembling needs 4-5 days. Moreover, since the position is not the optimal assembling position, it usually requires dismounting 4-5 times and also requires the workers to assemble with rich experience, and each assembling needs to go through hot working and cold working. Thus, the current aero engine assembling method has low mounting efficiency, and it is difficult to mount. Besides, the coaxality is poor after assembling, which affects engine performance.

SUMMARY OF THE INVENTION

Aiming at the disadvantages existing in the prior art above, an aero engine rotor air floatation assembling method and device based on a gantry structure are proposed to solve the problem of low coaxality after the aero engine rotor is assembled, so as to achieve the aims of high coaxality after the rotor is assembled, reduced vibration, mounting easiness, high flexibility and improved engine performance.

The object of the present invention is achieved by the following approaches:

An aero engine rotor air floatation assembling method based on a gantry structure is provided, and the steps of this measuring method are as follows:

disposing and fixing a measured rotor on a worktable for adjusting concentricity and inclination; an axial eddy current sensor for measuring an axial mounting reference plane measuring an axial mounting reference plane of the measured rotor so as to adjust inclination; a radial eddy current sensor for measuring a radial mounting reference plane measuring a radial mounting reference plane so as to adjust concentricity; an air bearing rotary table driving the measured rotor to rotate at a uniform speed of 6 to 10 r/min via the worktable for adjusting concentricity and inclination, the axial eddy current sensor for measuring an axial mounting reference plane taking samples at uniform interval on the axial mounting reference plane of the measured rotor, and the radial eddy current sensor for measuring a radial mounting reference plane taking samples at uniform interval on the radial mounting reference plane of the measured rotor; making the sampling points satisfy that there are 1000 to 2000 points every circle; fitting the sampling data on the radial mounting reference plane of the measured rotor by the Least Squares Circle so as to assess the eccentricity, and fitting the sampling data on the axial mounting reference plane of the measured rotor by the Least Square Plane so as to assess the inclination; adjusting a concentricity adjusting knob of the worktable for adjusting concentricity and inclination according to the dimension and the angle of the eccentricity; adjusting an inclination adjusting knob of the worktable for adjusting concentricity and inclination according to the dimension and the angle of the inclination, until the worktable for adjusting concentricity and inclination satisfying that the dimension of the eccentricity of the radial reference plane is in the range of 0 to 3 μm and that the dimension of the inclination of the axial reference plane is in the range of 0 to 2"; the axial eddy current sensor for measuring an axial mounting reference plane measuring the axial mounting measuring plane of the measured rotor, and the radial eddy current sensor for measuring a radial mounting reference plane measuring the radial mounting measuring plane of the measured rotor; the air bearing rotary table rotating at a uniform speed of 6 to 10 r/min, and the axial eddy current sensor for measuring an axial mounting measuring plane taking samples at uniform interval on the axial mounting measuring plane of the measured rotor, and the radial eddy current sensor for measuring a radial mounting measuring plane respectively taking samples at uniform interval on the radial mounting measuring plane; making the sampling points satisfy that there are 1000 to 2000 points every circle; fitting the sampled data on the radial mounting measuring plane of the measured rotor obtained with the radial eddy current sensor for measuring a radial mounting measuring plane by the Least Squares Circle so as to assess the concentricity; fitting the sampling data on the axial mounting measuring plane of the measured rotor obtained with the axial eddy current sensor for measuring an axial mounting measuring plane by the Least Square Plane so as to assess the verticality; combining the radius of the axial mounting measuring plane and the height difference between the measured rotor and the finally assembled rotor to obtain the influencing weight of this rotor to the assembled rotor on coaxality; measuring respectively all the rotors required for assembling to obtain the influencing weight of each rotor to the assembled rotor on coaxality; vector optimizing the weight of each rotor by genetic algorithm to obtain the assembling angle of each rotor, and calculating the influencing weight of the rotor on coaxality with the following formula: CoaxWeight=C∠φ–H/R P∠θ, wherein: C representing the concentricity of the radial mounting measuring plane of the measured rotor, φ representing the eccentric angle of the fitting circle center of the radial mounting measuring plane, H representing the height difference between the measured rotor and the finally assembled rotor, R representing the radius of the axial mounting measuring plane, P representing the verticality of the axial mounting measuring plane of the measured rotor, and θ representing the angle at the highest point of the fitting plane of the axial mounting measuring plane.

The structure of an aero engine rotor air floatation assembling device based on a gantry structure, wherein, an air bearing being nested on the central position of a base, the air bearing being constituted by an air spindle, a worktable, an air bearing shaft upper platen, an air bearing shaft lower platen, a grating ruler reading head and a grating ruler, the worktable being disposed on the upper end portion of the air bearing shaft upper platen, the air bearing shaft upper platen being disposed on the upper end portion of the air spindle, the air spindle being disposed on the upper end portion of the air bearing shaft lower platen, the grating ruler being nested on the outer ring of the air bearing shaft lower platen, the grating ruler reading head being fixedly disposed at the lower portion inside of the center position of the base and located at the outside of the grating ruler, a worktable for adjusting concentricity and inclination being disposed on the central position of the air bearing, a three jaw electric chuck being disposed on the central position of the worktable for adjusting concentricity and inclination; a door shaped left pillar and a door shaped right pillar being symmetrically distributed on the both sides of the air bearing and being fixedly mounted on the base, and the both ends of a door shaped lateral beam being fixedly connected with the upper end of the door shaped left pillar and the upper end of the door shaped right pillar; a left upper pillar-rod connector and a left lower pillar-rod connector being movably adjustably sleeved on the door shaped left pillar sequentially from top to bottom, a left upper lateral measuring rod being horizontally nested on the left upper pillar-rod connector, an upper sensor adapting part being fixedly connected with the left upper lateral measuring rod, an upper axial eddy current sensor being fixedly connected with the upper sensor adapting part; a left lower lateral measuring rod being horizontally nested on the left lower pillar-rod connector, a lower sensor adapting part being fixedly connected with the left lower lateral measuring rod, a lower axial eddy current sensor being fixedly connected with the lower sensor adapting part; a right upper pillar-rod connector and a right lower pillar-rod connector being movably adjustably sleeved on the door shaped right pillar sequentially from top to bottom, a right upper lateral measuring rod being horizontally nested on the right upper pillar-rod connector, an upper radial eddy current sensor being fixedly connected with the right upper lateral measuring rod; the right lower lateral measuring rod being horizontally nested on the right lower pillar-rod connector, and a lower radial eddy current sensor being fixedly connected with the right lower lateral measuring rod.

Compared with the prior art, the features of the present invention are:

The present invention can obtain the coaxality weight of each rotor by measuring the concentricity and verticality of each rotor, and then can obtain the guidance mounting angle by vector optimizing the coaxality weight of each rotor, therefore, can save 40% mounting time and cost, obtain 98% one-time mounting success rate, predict the mounting progress, improve engine stability, reduce engine vibration, save engine fuel consumption, reduce $CO_2$ emission, and reduce engine noise pollution.

REFERENCE NUMERALS

Figure 1:
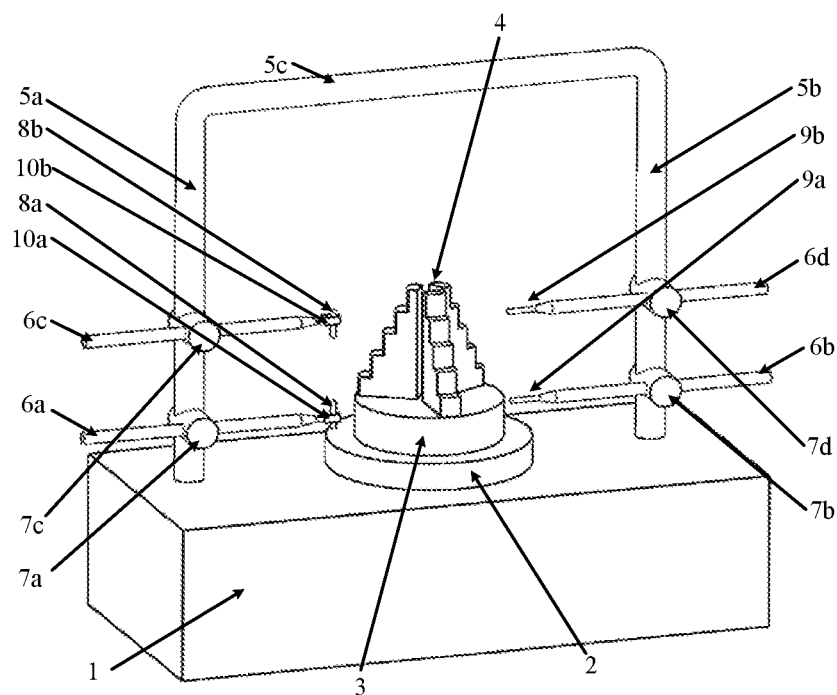
FIG. 1 is a structural schematic view of a four-probe measuring device.
Figure 2:
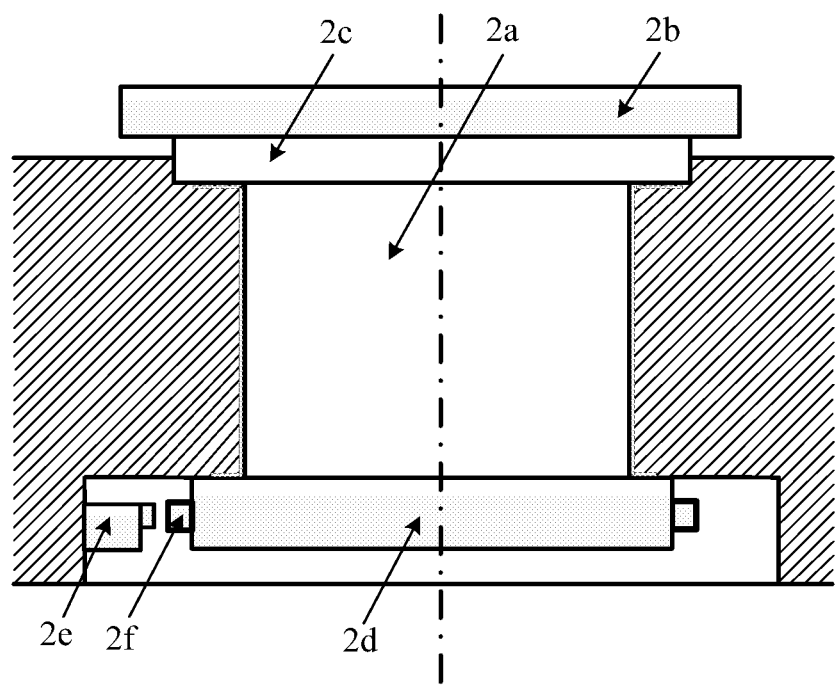
FIG. 2 is a structural schematic view of an air bearing.

1—base
2—air bearing,
2a—air spindle,
2b—worktable,
2c—air bearing shaft upper platen,
2d—air bearing shaft lower platen,
2e—grating ruler reading head,
2f—grating ruler,
3—worktable for adjusting concentricity and inclination,
4—three-jaw electric chuck,
5a—door shaped left pillar,
5b—door shaped right pillar,
5c—door shaped lateral beam,
6a—left lower lateral measuring rod,
6b—right lower lateral measuring rod,
6c—left upper lateral measuring rod,
6d—right upper lateral measuring rod,
7a—left lower pillar-rod connector,
7b—right lower pillar-rod connector,
7c—left upper pillar-rod connector,
7d—right upper pillar-rod connector,
8a—lower axial eddy current sensor,
8b—upper axial eddy current sensor,
9a—lower radial eddy current sensor,
9b—upper radial eddy current sensor,
10a—lower sensor adapting part,
10b—upper sensor adapting part.

DETAILED DESCRIPTION OF THE EMBODIMENTS

Hereinafter, the present invention will be described in further detail with reference to the drawings:

An aero engine rotor air floatation assembling method and device based on a gantry structure are provided, and the method and device are: a three jaw electric chuck 4 is disposed on the central position of a worktable for adjusting concentricity and inclination 3. A door shaped left pillar 5a and a door shaped right pillar 5b are symmetrically distributed on the both sides of an air bearing 2 and are fixedly mounted on the base 1, and the both ends of a door shaped lateral beam 5c are fixedly connected with the upper end of the door shaped left pillar 5a and the upper end of the door shaped right pillar 5b. A left upper pillar-rod connector 7c and a left lower pillar-rod connector 7a are movably adjustably sleeved on the door shaped left pillar 5a sequentially from top to bottom, and a left upper lateral measuring rod 6c is horizontally nested on the left upper pillar-rod connector 7c, while an upper sensor adapting part 10b is fixedly connected with the left upper lateral measuring rod 6c, and an upper axial eddy current sensor 8b is fixedly connected with the upper sensor adapting part 10b; a left lower lateral measuring rod 6a is horizontally nested on the left lower pillar-rod connector 7a, and a lower sensor adapting part 10a is fixedly connected with the left lower lateral measuring rod 6a, while a lower axial eddy current sensor 8a is fixedly connected with the lower sensor adapting part 10a. A right upper pillar-rod connector 7d and a right lower pillar-rod connector 7b are movably adjustably sleeved on the door shaped right pillar 5b sequentially from top to bottom, and a right upper lateral measuring rod 6d is horizontally nested on the right upper pillar-rod connector 7d, while an upper radial eddy current sensor 9b is fixedly connected with the right upper lateral measuring rod 6d; the right lower lateral measuring rod 6b is horizontally nested on the right lower pillar-rod connector 7b, and a lower radial eddy current sensor 9a is fixedly connected with the right lower lateral measuring rod 6b. The air bearing 2 is nested on the central position of base 1, and the air bearing 2 is constituted by an air spindle 2a, a worktable 2b, an air bearing shaft upper platen 2c, an air bearing shaft lower platen 2d, a grating ruler reading head 2e and a grating ruler 2f. The worktable 2b is disposed on the upper end portion of the air bearing shaft upper platen 2c, and the air bearing shaft upper platen 2c is disposed on the upper end portion of the air spindle 2a. The air spindle 2a is disposed on the upper end portion of the air bearing shaft lower platen 2d, and the grating ruler 2f is nested on the outer ring of the air bearing shaft lower platen 2d. The grating ruler reading head 2e is fixedly disposed at the lower portion inside of the center position of the base 1, and is located at the outside of the grating ruler 2f. The air bearing 2 drives a measured rotor to rotate at a uniform speed of 6 to 10 r/min. A lower axial eddy current sensor 8a takes samples at uniform interval on the axial mounting reference plane of the measured rotor, and a lower radial eddy current sensor 9a takes samples at uniform interval on the radial mounting reference plane of the measured rotor. The sampling points should satisfy that there are 1000 to 2000 points every circle. The sampling data on the radial mounting reference plane of the measured rotor is fitted by the Least Squares Circle so as to assess the eccentricity; the sampling data on the axial mounting reference plane of the measured rotor is fitted by the Least Square Plane so as to assess the inclination; the worktable for adjusting concentricity and inclination 3 is disposed on the central position of the air bearing 2, and according to the dimension and the angle of the eccentricity, the worktable for adjusting concentricity and inclination 3 is adjusted until it satisfies that the dimension of the eccentricity of the radial reference plane is in the range of 0 to 3 μm; according to the dimension and the angle of inclination, the worktable for adjusting concentricity and inclination 3 is adjusted until it satisfies that the dimension of the inclination of the axial reference plane is in the range of 0 to 2". The right upper pillar-rod connector 7d is vertically nested on the upper side of the door shaped right pillar 5b, and the right upper lateral measuring rod 6d is horizontally nested on the right upper pillar-rod connector 7d. The upper radial eddy current sensor 9b is fixedly connected with the right upper lateral measuring rod 6d, and the upper radial eddy current sensor 9b measures the radial mounting measuring plane of the measured rotor, and the left upper pillar-rod connector 7c is vertically nested on the upper side of the door shaped left pillar 5a. The left upper lateral measuring rod 6c is horizontally nested on the left upper pillar-rod connector 7c, and the upper axial eddy current sensor 8b is fixedly connected with the upper sensor adapting part 10b. The upper axial eddy current sensor 8b measures the axial mounting measuring plane of the measured rotor; and the air bearing 2 rotates at an uniform speed of 6 to r 10/min; the upper radial eddy current sensor 9b takes samples at uniform interval on the radial mounting measuring plane of the measured rotor, and the upper axial eddy current sensor 8b takes samples at uniform interval on the axial mounting measuring plane of the measured rotor; the sampling points should satisfy that there are 1000 to 2000 points every circle; the sampled data on the radial mounting measuring plane of the measured rotor by the upper radial eddy current sensor 9b is fitted by the Least Squares Circle so as to assess the concentricity; the sampled data on the axial mounting measuring plane of the measured rotor by the upper axial eddy current sensor 8b is fitted by the Least Square Plane so as to assess the verticality, and by combining the radius of the axial mounting measuring plane and the height difference between the measured rotor and the finally assembled rotor, the influencing weight of this rotor to the assembled rotor on coaxality is obtained; all the rotors required for assembling are measured respectively, so as to obtain the influencing weight of each rotor to the assembled rotor on coaxality; the weight of each rotor is vector optimized by genetic algorithm in order to obtain the assembling angle of each rotor, and the influencing weight of the rotor on coaxality is calculated with the following formula: CoaxWeight=C∠φ−H/R P∠θ, wherein: C represents the concentricity of the radial mounting measuring plane of the measured rotor; φ represents the eccentric angle of the fitting circle center of the radial mounting measuring plane; H represents the height difference between the measured rotor and the finally assembled rotor; R represents the radius of the axial mounting measuring plane; P represents the verticality of the axial mounting measuring plane the measured rotor; and θ represents the angle at the highest point of the fitting plane of the axial mounting measuring plane.

The invention claimed is:
1. An aero engine rotor air floatation assembling device based on a gantry structure, wherein,
   an air bearing being nested on the central position of a base, the air bearing being constituted by an air spindle, a worktable, an air bearing shaft upper platen, an air bearing shaft lower platen, a grating ruler reading head and a grating ruler,
   the worktable being disposed on the upper end portion of the air bearing shaft upper platen, the air bearing shaft upper platen being disposed on the upper end portion of the air spindle, the air spindle being disposed on the upper end portion of the air bearing shaft lower platen, the grating ruler being nested on the outer ring of the air bearing shaft lower platen, the grating ruler reading head being fixedly disposed at the lower portion inside of the center position of the base and located at the outside of the grating ruler,
   a worktable for adjusting concentricity and inclination being disposed on the central position of the air bearing, a three jaw electric chuck being disposed on the central position of the worktable for adjusting concentricity and inclination;
   a door shaped left pillar and a door shaped right pillar being symmetrically distributed on the both sides of the air bearing and being fixedly mounted on the base, and the both ends of a door shaped lateral beam being fixedly connected with the upper end of the door shaped left pillar and the upper end of the door shaped right pillar;
   a left upper pillar-rod connector and a left lower pillar-rod connector being movably adjustably sleeved on the door shaped left pillar sequentially from top to bottom, a left upper lateral measuring rod being horizontally nested on the left upper pillar-rod connector, an upper sensor adapting part being fixedly connected with the left upper lateral measuring rod, an upper axial eddy current sensor being fixedly connected with the upper sensor adapting part;
   a left lower lateral measuring rod being horizontally nested on the left lower pillar-rod connector, a lower sensor adapting part being fixedly connected with the left lower lateral measuring rod, a lower axial eddy current sensor being fixedly connected with the lower sensor adapting part;
   a right upper pillar-rod connector and a right lower pillar-rod connector being movably adjustably sleeved on the door shaped right pillar sequentially from top to bottom, a right upper lateral measuring rod being horizontally nested on the right upper pillar-rod connector, an upper radial eddy current sensor being fixedly connected with the right upper lateral measuring rod;
   the right lower lateral measuring rod being horizontally nested on the right lower pillar-rod connector, and a lower radial eddy current sensor being fixedly connected with the right lower lateral measuring rod.

* * * * *